US012149480B2

(12) United States Patent
Elshafie et al.

(10) Patent No.: US 12,149,480 B2
(45) Date of Patent: Nov. 19, 2024

(54) NACK-ONLY OR ACK-ONLY FEEDBACK SELECTION FOR SEMI-PERSISTENT SCHEDULING CONFIGURATIONS

(71) Applicant: QUALCOMM Incorporated, San Diego, CA (US)

(72) Inventors: Ahmed Elshafie, San Diego, CA (US); Yi Huang, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 330 days.

(21) Appl. No.: 17/454,467

(22) Filed: Nov. 10, 2021

(65) Prior Publication Data

US 2022/0150028 A1    May 12, 2022

Related U.S. Application Data

(60) Provisional application No. 63/198,769, filed on Nov. 11, 2020.

(51) Int. Cl.
*H04L 5/00* (2006.01)

(52) U.S. Cl.
CPC .......... *H04L 5/0055* (2013.01); *H04L 5/0042* (2013.01)

(58) Field of Classification Search
CPC ... H04L 5/0055; H04L 5/0042; H04L 1/1854; H04L 1/1861; H04L 1/1896; H04L 1/203; H04L 5/0094
See application file for complete search history.

(56) References Cited

U.S. PATENT DOCUMENTS

| | | | |
|---|---|---|---|
| 2019/0268972 A1* | 8/2019 | Chen | H04L 1/0003 |
| 2020/0374911 A1* | 11/2020 | Lee | H04L 5/0007 |
| 2022/0007399 A1* | 1/2022 | Rastegardoost | H04L 5/0055 |
| 2022/0053535 A1* | 2/2022 | Xu | H04W 72/23 |
| 2022/0377796 A1* | 11/2022 | Jung | H04L 1/1864 |
| 2023/0093477 A1* | 3/2023 | El Hamss | H04L 1/1861 |

FOREIGN PATENT DOCUMENTS

WO    WO-2022000318 A1 *    1/2022

\* cited by examiner

*Primary Examiner* — Edan Orgad
*Assistant Examiner* — Malick A Sohrab
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may select, from at least an acknowledgment (ACK)-only feedback configuration and a negative ACK (NACK)-only feedback configuration and based at least in part on an error rate and a traffic condition associated with a semi-persistent scheduling (SPS) resource allocation, a feedback configuration for the SPS resource allocation. The UE may transmit feedback regarding the SPS resource allocation using the selected feedback configuration. Numerous other aspects are provided.

30 Claims, 9 Drawing Sheets

NACK-ONLY OR ACK-ONLY FEEDBACK SELECTION FOR SEMI-PERSISTENT SCHEDULING CONFIGURATIONS

CROSS-REFERENCE TO RELATED APPLICATION

This Patent Application claims priority to U.S. Provisional Patent Application No. 63/198,769, filed on Nov. 11, 2020, entitled "NACK-ONLY OR ACK-ONLY FEEDBACK SELECTION FOR SEMI-PERSISTENT SCHEDULING CONFIGURATIONS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for acknowledgement (ACK) only or negative ACK (NACK) only feedback selection for semi-persistent scheduling configurations.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes selecting, from at least an acknowledgment (ACK)-only feedback configuration and a negative ACK (NACK)-only feedback configuration and based at least in part on an error rate and a traffic condition associated with a semi-persistent scheduling (SPS) resource allocation, a feedback configuration for the SPS resource allocation; and transmitting feedback regarding the SPS resource allocation using the selected feedback configuration.

In some aspects, a method of wireless communication performed by a base station includes selecting, from at least an ACK-only feedback configuration and a NACK-only feedback configuration based at least in part on an error rate and a traffic condition associated with a SPS resource allocation, a feedback configuration for the SPS resource allocation; and receiving, from a UE, feedback regarding the SPS resource allocation using the selected feedback configuration.

In some aspects, a UE for wireless communication includes a memory; and one or more processors coupled to the memory, the memory and the one or more processors configured to: select, from at least an ACK-only feedback configuration and a NACK-only feedback configuration and based at least in part on an error rate and a traffic condition associated with a SPS resource allocation, a feedback configuration for the SPS resource allocation; and transmit feedback regarding the SPS resource allocation using the selected feedback configuration.

In some aspects, a base station for wireless communication includes a memory; and one or more processors coupled to the memory, the memory and the one or more processors configured to: select, from at least an ACK-only feedback configuration and a NACK-only feedback configuration based at least in part on an error rate and a traffic condition associated with a SPS resource allocation, a feedback configuration for the SPS resource allocation; and receive, from a UE, feedback regarding the SPS resource allocation using the selected feedback configuration.

In some aspects, a non-transitory computer-readable medium storing a set of instructions for wireless communication includes one or more instructions that, when executed by one or more processors of a UE, cause the UE to: select, from at least an ACK-only feedback configuration and a NACK-only feedback configuration and based at least in part on an error rate and a traffic condition associated with a SPS resource allocation, a feedback configuration for the SPS resource allocation; and transmit feedback regarding the SPS resource allocation using the selected feedback configuration.

In some aspects, a non-transitory computer-readable medium storing a set of instructions for wireless communication includes one or more instructions that, when executed by one or more processors of a base station, cause the base station to: select, from at least an ACK-only feedback configuration and a NACK-only feedback configuration based at least in part on an error rate and a traffic condition associated with a SPS resource allocation, a feedback configuration for the SPS resource allocation; and receive, from a UE, feedback regarding the SPS resource allocation using the selected feedback configuration.

In some aspects, an apparatus for wireless communication includes means for selecting, from at least an ACK-only feedback configuration and a NACK-only feedback configuration and based at least in part on an error rate and a traffic condition associated with a SPS resource allocation, a feedback configuration for the SPS resource allocation; and means for transmitting feedback regarding the SPS resource allocation using the selected feedback configuration.

In some aspects, an apparatus for wireless communication includes means for selecting, from at least an ACK-only feedback configuration and a NACK-only feedback configuration based at least in part on an error rate and a traffic condition associated with a SPS resource allocation, a feedback configuration for the SPS resource allocation; and means for receiving, from a UE, feedback regarding the SPS resource allocation using the selected feedback configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
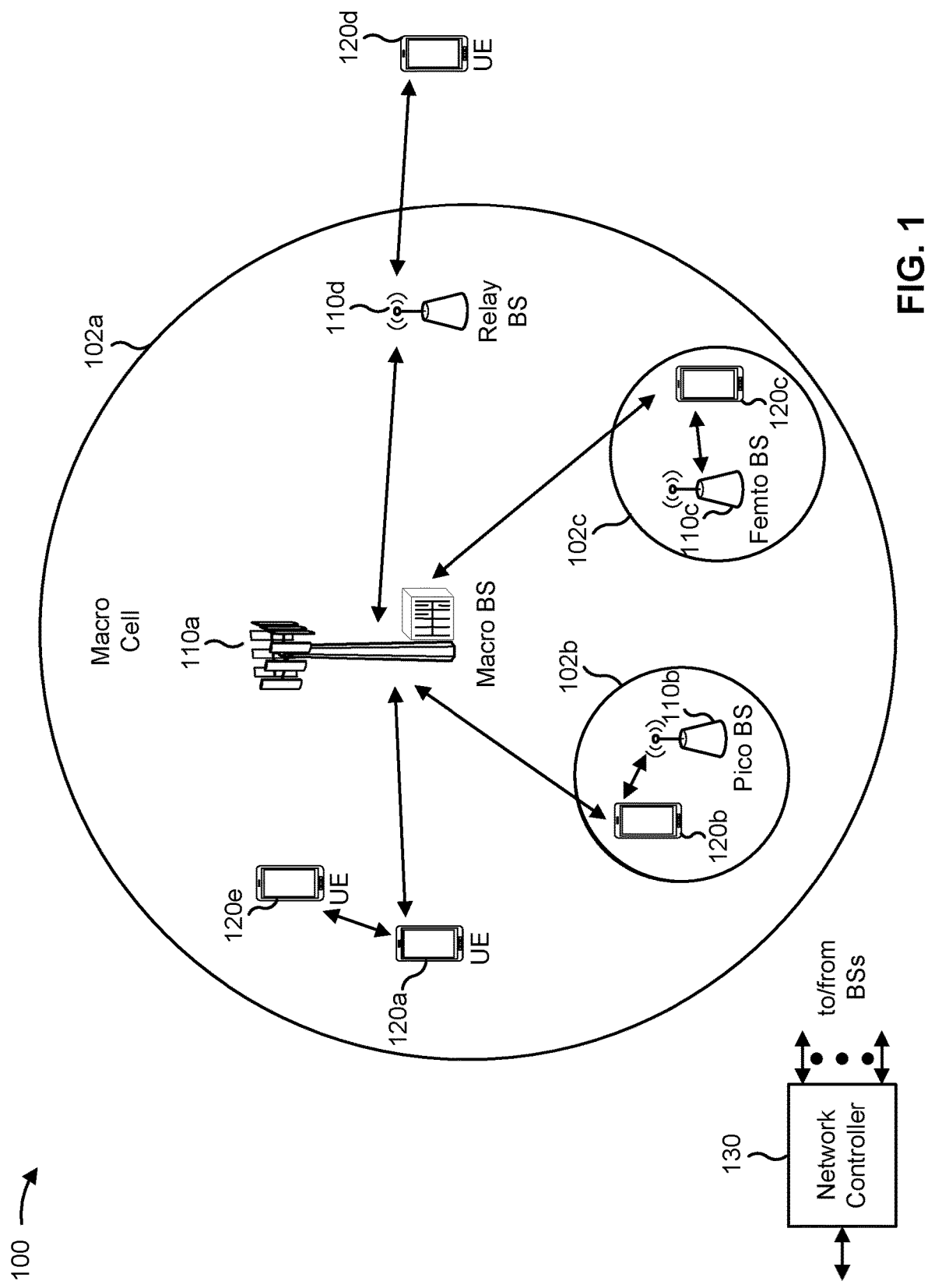
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. ABS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
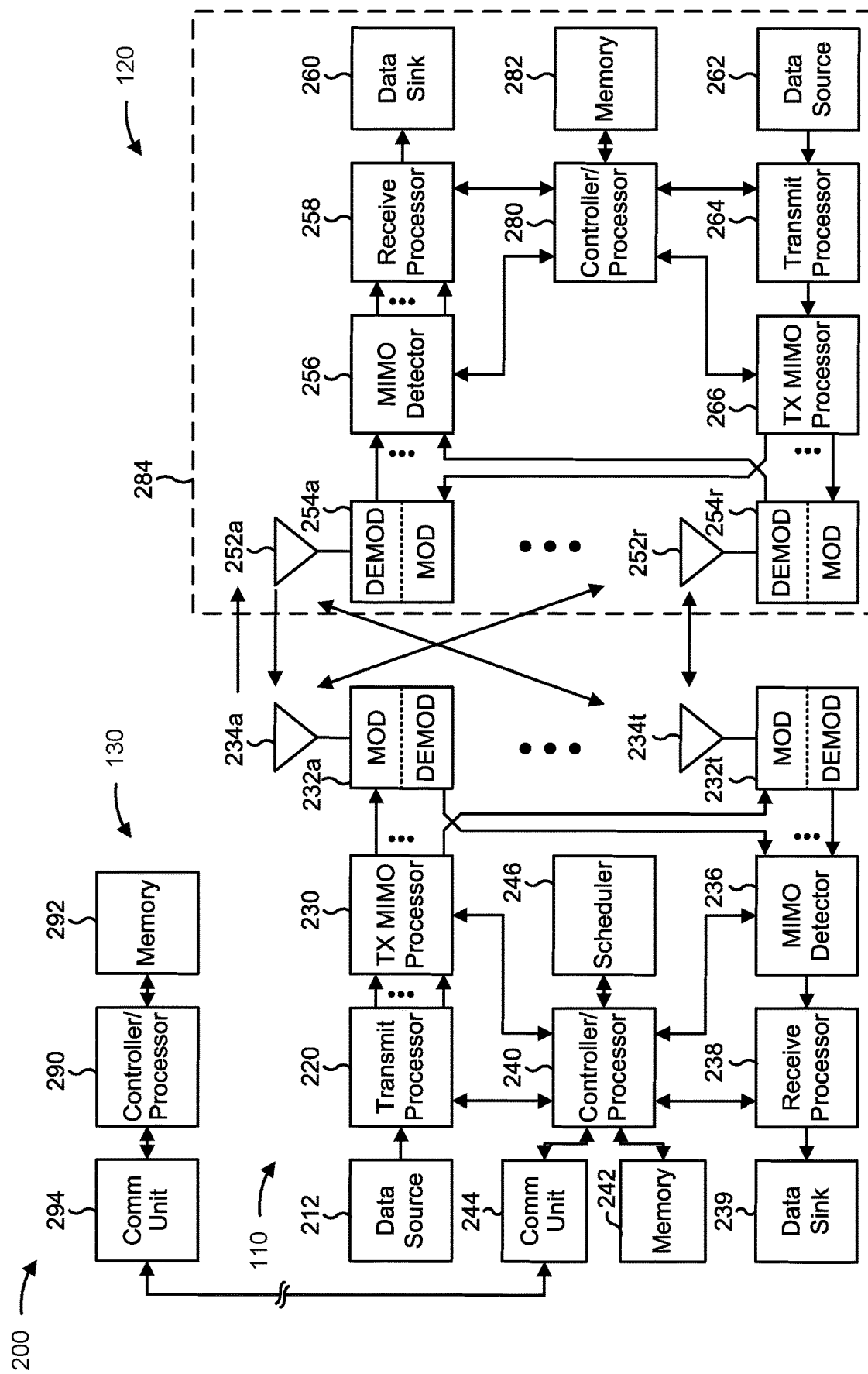
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-7).

Controller/processor 240 of base station 110, controller/processor 280 of UE 120, and/or any other component(s) of FIG. 2 may perform one or more techniques associated with ACK-only or NACK-only feedback selection for semi-persistent scheduling configurations, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, the UE 120 includes means for selecting (e.g., using antenna 252, DEMOD 254, MIMO detector 256, receive processor 258, controller/processor 280, and/or the like), from at least an ACK-only feedback configuration and a NACK-only feedback configuration and based at least in part on an error rate and a traffic condition associated with an SPS resource allocation, a feedback configuration for the SPS resource allocation; and/or means for transmitting feedback regarding the SPS resource allocation using the selected feedback configuration. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for receiving (e.g., using antenna 252, DEMOD 254, MIMO detector 256, receive processor 258, controller/processor 280, and/or the like) information indicating the target block error rate (BLER) via at least one of:

In some aspects, the UE 120 includes means for determining (e.g., using antenna 252, DEMOD 254, MIMO detector 256, receive processor 258, controller/processor 280, and/or the like) the error rate based at least in part on an SPS configuration associated with the SPS resource allocation, wherein the SPS configuration is configured with the error rate.

In some aspects, the UE 120 includes means for receiving (e.g., using antenna 252, DEMOD 254, MIMO detector 256, receive processor 258, controller/processor 280, and/or the like) information indicating the traffic condition.

In some aspects, the UE 120 includes means for receiving (e.g., using antenna 252, DEMOD 254, MIMO detector 256, receive processor 258, controller/processor 280, and/or the like) information indicating the error rate.

In some aspects, the UE 120 includes means for receiving (e.g., using antenna 252, DEMOD 254, MIMO detector 256, receive processor 258, controller/processor 280, and/or the like) an indication of the selected feedback configuration based at least in part on F1 being equal to F2.

In some aspects, the UE 120 includes means for receiving (e.g., using antenna 252, DEMOD 254, MIMO detector 256, receive processor 258, controller/processor 280, and/or the like) information indicating the selected feedback configuration, wherein selecting the feedback configuration is based at least in part on the information indicating the selected feedback configuration.

In some aspects, the UE 120 includes means for receiving (e.g., using antenna 252, DEMOD 254, MIMO detector 256, receive processor 258, controller/processor 280, and/or the like), based at least in part on a window associated with the SPS resource allocation, information indicating whether to provide hybrid automatic repeat request (ACK) feedback for expired hybrid automatic repeat request (HARD) ACK communications.

In some aspects, the BS 110 includes means for selecting (e.g., using antenna 234, DEMOD 232, MIMO detector 236, receive processor 238, controller/processor 240, and/or the like), from at least an ACK-only feedback configuration and a NACK-only feedback configuration based at least in part on an error rate and a traffic condition associated with an SPS resource allocation, a feedback configuration for the SPS resource allocation; and/or means for receiving, from a UE, feedback regarding the SPS resource allocation using the selected feedback configuration. The means for the BS 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the BS 110 includes means for transmitting (e.g., using controller/processor 240, transmit processor 220, TX MIMO processor 230, MOD 232, antenna 234, and/or the like) information indicating the target BLER via at least one of:

In some aspects, the BS 110 includes means for (e.g., using controller/processor 240, transmit processor 220, TX MIMO processor 230, MOD 232, antenna 234, and/or the like) determining the error rate based at least in part on an SPS configuration associated with the SPS resource allocation, wherein the SPS configuration is configured with the error rate.

In some aspects, the BS 110 includes means for transmitting (e.g., using controller/processor 240, transmit processor 220, TX MIMO processor 230, MOD 232, antenna 234, and/or the like) information indicating the traffic condition.

In some aspects, the BS 110 includes means for transmitting (e.g., using controller/processor 240, transmit processor 220, TX MIMO processor 230, MOD 232, antenna 234, and/or the like) information indicating the error rate.

In some aspects, the BS 110 includes means for transmitting (e.g., using controller/processor 240, transmit processor 220, TX MIMO processor 230, MOD 232, antenna 234, and/or the like) an indication of the selected feedback configuration based at least in part on F1 being equal to F2.

In some aspects, the BS 110 includes means for transmitting (e.g., using controller/processor 240, transmit processor 220, TX MIMO processor 230, MOD 232, antenna 234, and/or the like) information indicating the selected feedback configuration.

In some aspects, the BS 110 includes means for transmitting (e.g., using controller/processor 240, transmit processor 220, TX MIMO processor 230, MOD 232, antenna 234, and/or the like), based at least in part on a window associated with the SPS resource allocation, information indicating whether to provide hybrid automatic repeat request (ACK) feedback for expired HARQ-ACK communications.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
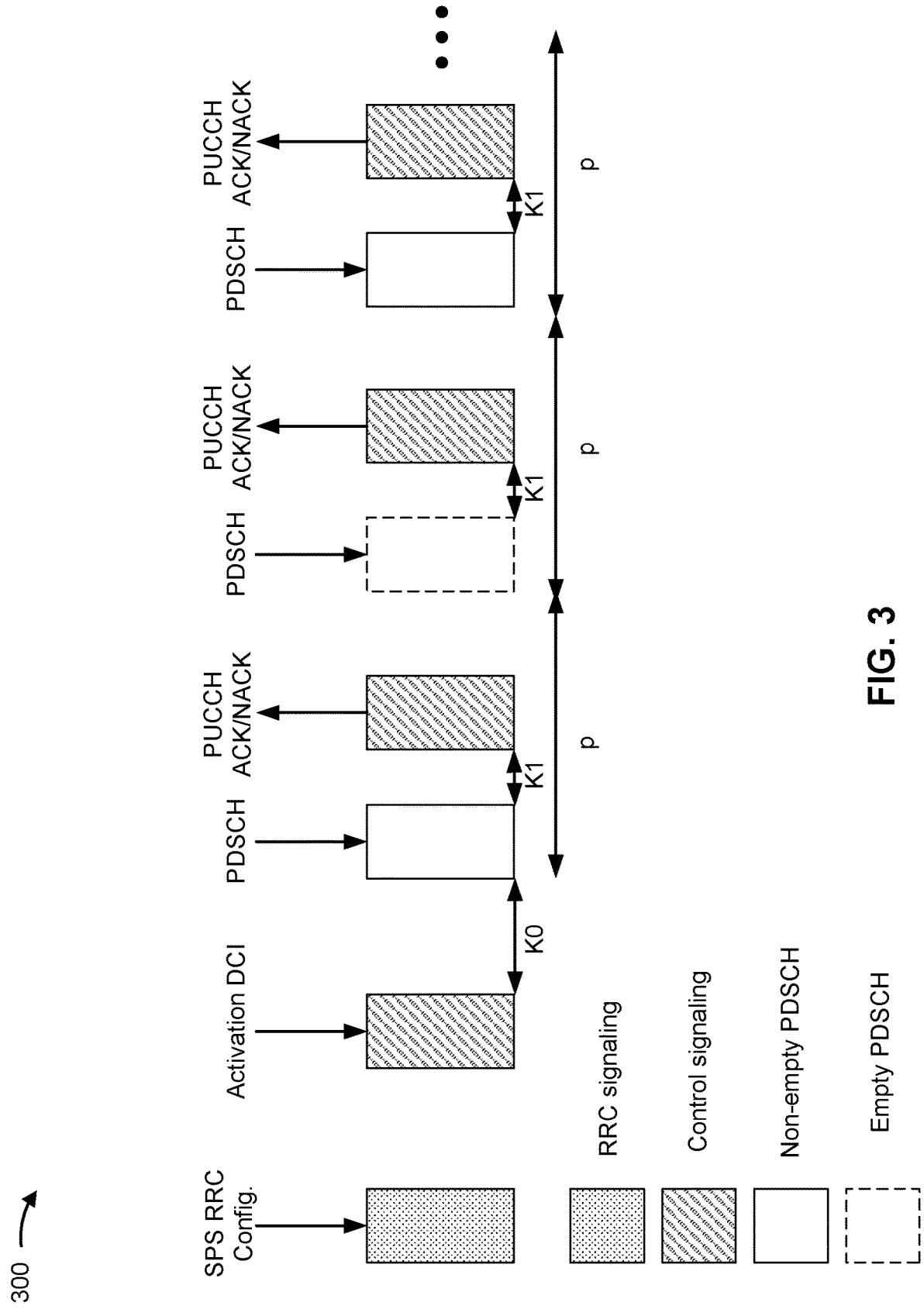
FIG. 3 is a diagram illustrating an example of semi-persistent scheduling (SPS) configuration and communication, in accordance with the present disclosure.

FIG. 3 is a diagram illustrating an example 300 of semi-persistent scheduling (SPS) configuration and communication, in accordance with the present disclosure. FIG. 3 shows communication between a UE (e.g., UE 120) and a BS (e.g., BS 110). The communications are indicated by rectangles, and include configuration signaling (e.g., radio resource control (RRC) signaling), downlink control information (DCI), which may be conveyed via a physical downlink control channel (PDCCH) or a physical downlink shared channel (PDSCH), a PDSCH (which may be associated with an SPS occasion), and HARQ-ACK feedback which may be transmitted on a physical uplink control channel (PUCCH). The HARQ-ACK feedback is shown as "ACK/NACK." A downward arrow associated with a communication indicates a downlink communication, and an upward arrow associated with a communication indicates an uplink communication. It should be understood that a reference to ACK/NACK feedback can also refer to ACK-only feedback or NACK-only feedback, depending on the context.

As shown, the UE may receive an SPS RRC configuration. The SPS RRC configuration may indicate parameters for an SPS configuration of the UE. For example, the SPS RRC configuration may indicate a periodicity for the SPS configuration (p), a first offset (K0) between activating DCI and a first SPS occasion of an SPS resource allocation, a second offset (K1) between an SPS occasion and a corresponding reporting occasion, or the like. In some aspects, K0, K1, and p may be defined in terms of slots, though other definitions of K0, K1, and p may be used.

In some aspects, the SPS RRC configuration may indicate an SPS resource allocation, which may be defined based at least in part on one or more of the above parameters and/or other parameters. In some aspects, the SPS RRC configuration may configure multiple SPS configurations, and activation DCI may activate one (or more) of the multiple SPS configurations.

As shown, the UE may receive activation DCI. Activation DCI is DCI configured to activate an SPS resource allocation. For example, activation DCI may cause the UE to begin monitoring SPS occasions of the SPS resource allocation. The UE may monitor SPS occasions starting after the first offset K0 has elapsed, and may monitor SPS occasions in accordance with the periodicity p. The UE may report HARQ-ACK feedback regarding the SPS occasions in accordance with the second offset K1. The activation DCI may indicate one or more parameters for the activated SPS configuration, such as a modulation and coding scheme (MCS), a resource block (RB) allocation, one or more antenna ports for SPS transmission, or the like.

As shown by the dashed outline of the second SPS occasion, some SPS occasions may be empty, also referred to herein as being skipped. An empty SPS occasion (also known as a skipped SPS occasion) is a set of resources, included in an SPS resource allocation, that are not used by a BS for a transmission. The BS can determine that an SPS occasion is to be empty based at least in part on a variety of factors. An SPS occasion that is not empty or is not skipped (e.g., that includes a PDSCH carrying data directed to a UE) is referred to herein as a non-empty SPS occasion or a non-skipped SPS occasion. The number of empty SPS occasions in a window of SPS occasions may vary. For example, some SPS resource allocations may be associated with more empty SPS occasions than other SPS resource allocations.

As shown, after each SPS occasion, the UE may transmit HARQ-ACK feedback regarding a result of monitoring the SPS occasion. The UE may transmit an ACK if the UE successfully decoded a communication in the SPS occasion or may transmit a NACK if the UE failed to decode a communication in the SPS occasion. For example, the UE may transmit a NACK for an empty SPS occasion and for a non-empty SPS occasion in which the UE failed to decode a communication. In some deployments, the UE may transmit HARQ-ACK feedback regarding multiple SPS occasions in a single uplink grant, such as after the multiple SPS occasions have occurred.

Reporting HARQ-ACK feedback regarding each SPS occasion can use communication and computing resources of the UE and the base station and can increase overhead. Two HARQ-ACK feedback configurations have been proposed to reduce the amount of reporting overhead associated with SPS occasions: an ACK-only feedback configuration and a NACK-only feedback configuration. In an ACK-only feedback configuration, the UE may report only ACKs (e.g., for SPS occasions in which the UE successfully decodes a communication), and the UE may not report NACKs. In a NACK-only feedback configuration, the UE may report only NACKs (e.g., for empty SPS occasions and for SPS occasions in which the UE fails to decode a communication) and may not report ACKs. The UE may report a NACK for an empty SPS occasion since the UE in many scenarios cannot differentiate between empty SPS occasions and failed reception without other information.

For SPS, the network (e.g., using gNB link adaptation, power control, rate adaptation, and so on) may target a certain rate of success for an SPS PDSCH. This rate can be represented as an error rate, such as a target block error rate (BLER). The error rate is referred to herein by X. For enhanced mobile broadband (eMBB) traffic, an example target BLER may be 90%, meaning that 9/10 PDSCHs are targeted to be successfully decoded by the UE. For ultra-reliable low latency communication (URLLC) traffic, an example target BLER may be 99.999%, meaning that 99999/100000 PDSCHs are targeted to be successfully decoded by the UE.

If a HARQ-ACK feedback configuration is used in which both ACKs and NACKs are fed back to the BS, then the expected rate of ACKs may be equal to the error rate for an SPS resource allocation. Thus, in many scenarios, given a high SPS PDSCH success rate, NACK-only feedback may lead to lower overhead. However, in certain scenarios, with sparse traffic and many empty PDSCH occasions, NACK-only feedback can be associated with higher overhead than ACK-only feedback.

As a first example, consider M=6 SPS occasions, of which there are R=2 non-empty SPS occasions and (1−R)=4 empty SPS occasions. In this case, using an ACK-only feedback configuration would lead to up to 2 ACKs being transmitted, whereas using a NACK-only feedback configuration would lead to at least 4 NACKs being transmitted. Thus, ACK-only feedback is likely to lead to lower overhead in the first example. As a second example, consider M=6 SPS occasions, of which there are R=4 non-empty SPS occasions and (1−R)=2 empty SPS occasions. In this case, using an ACK-only feedback configuration would lead to up to 4 ACKs being transmitted, whereas using a NACK-only feedback configuration would lead to at least 2 NACKs being transmitted and likely fewer than 4 NACKs being transmitted (depending on the error rate of the SPS resource allocation). Thus, NACK-only feedback is likely to lead to lower overhead in the second example.

As can be seen above, there are some situations in which ACK-only feedback is preferable, and other situations in which NACK-only feedback is preferable. In some deployments, whether to use ACK-only feedback or NACK-only feedback may be statically or semi-statically configured. However, static or semi-static configuration may not provide sufficient flexibility for rapidly changing traffic conditions. In some deployments, a UE can determine whether to use ACK-only feedback or NACK-only feedback based at least in part on a traffic type, such as whether traffic is associated with an eMBB service or a URLLC service. However, the determination of whether to use ACK-only feedback or NACK-only feedback based at least in part on a traffic type may not take into account traffic conditions, such as the number of non-empty SPS occasions in a window, which may lead to inefficient or suboptimal selection of ACK-only versus NACK-only feedback.

Some techniques and apparatuses described herein provide for determination of whether to use an ACK-only or NACK-only feedback configuration based at least in part on a traffic condition and an error rate associated with a set of SPS occasions, such as an SPS resource allocation. In some aspects, the traffic condition may indicate a number of empty SPS occasions or a number of non-empty SPS occasions of the set of SPS occasions. The error rate may include, for example, a target BLER. In some aspects, the UE may select the feedback configuration based at least in part on information indicating the traffic condition (e.g., a bitmap indicating empty SPS occasions and/or non-empty SPS occasions, information indicating a number of empty SPS occasions and/or a number of non-empty SPS occasions, or the like). In some aspects, a BS may signal, to the UE, a feedback configuration to use based at least in part on the traffic condition and the error rate. In this way, overhead is reduced and utilization of communication resources of the UE and the BS is improved. Furthermore, dynamic (e.g., on the granularity of a window of M SPS occasions) selection of the feedback configuration is enabled, which improves adaptability of feedback and utilization of communication resources of the UE and the BS.

As indicated above, FIG. 3 is provided as an example. Other examples may differ from what is described with regard to FIG. 3.

Figure 4:
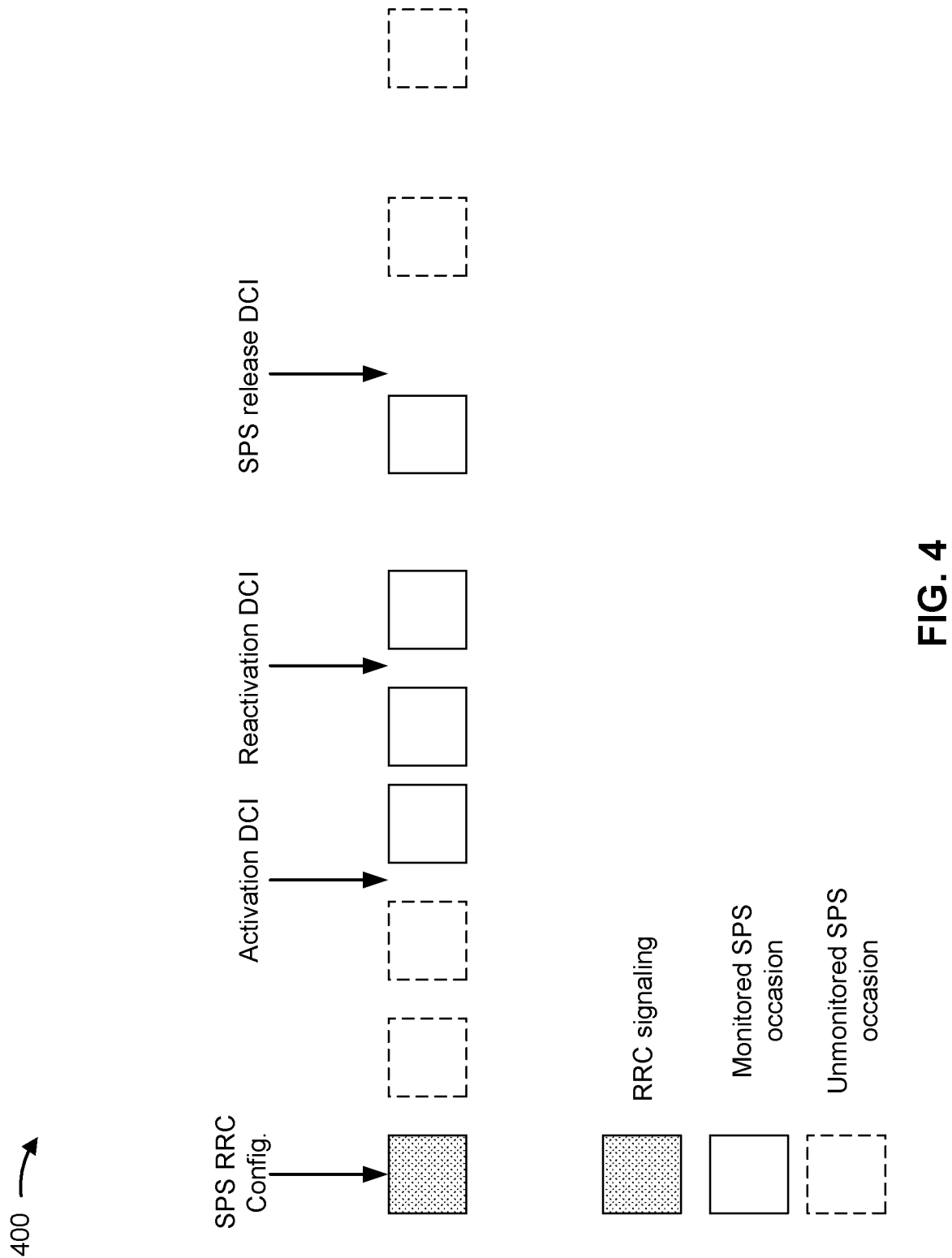
FIG. 4 is a diagram illustrating an example of SPS configuration, activation, reactivation, and release, in accordance with the present disclosure.

FIG. 4 is a diagram illustrating an example 400 of SPS configuration, activation, reactivation, and release, in accordance with the present disclosure. Similar to FIG. 3, FIG. 4 shows communication between a UE (e.g., UE 120) and a BS (e.g., BS 110). In FIG. 4, a dotted fill indicates RRC signaling, a dashed outline of a square indicates an unmonitored SPS occasion, and a solid outline of a square with a white fill indicates a monitored SPS occasion.

As shown, the UE may receive an SPS RRC configuration, as described in more detail in connection with FIG. 3. As further shown, the UE may not monitor SPS occasions defined by the SPS RRC configuration until an activation DCI is received. As shown, the UE may receive an activation DCI from the base station. The activation DCI is described in more detail in connection with FIG. 3. As further shown, the UE may begin monitoring SPS occasions based at least in part on the activation DCI and the SPS RRC configuration.

As shown, the UE may receive a reactivation DCI. The reactivation DCI may indicate an updated set of transmission parameters, relative to the activation DCI (e.g., MCS, RB allocation, antenna port configuration, or the like). In some aspects, the UE may receive the reactivation DCI during an SPS resource allocation activated by the activation DCI. In some aspects, the UE may receive the reactivation DCI after the SPS resource allocation activated by the activation DCI has ended. As shown, the UE may monitor SPS occasions after the reactivation DCI is received.

As shown, the UE may receive an SPS release DCI. The SPS release DCI may cause the UE to stop monitoring SPS occasions of an SPS resource allocation. For example, the SPS release DCI may deactivate the SPS configuration associated with the SPS release allocation. Accordingly, and as shown, SPS occasions after the SPS release DCI may be unmonitored SPS occasions.

As indicated above, FIG. 4 is provided as an example. Other examples may differ from what is described with regard to FIG. 4.

Figure 5:
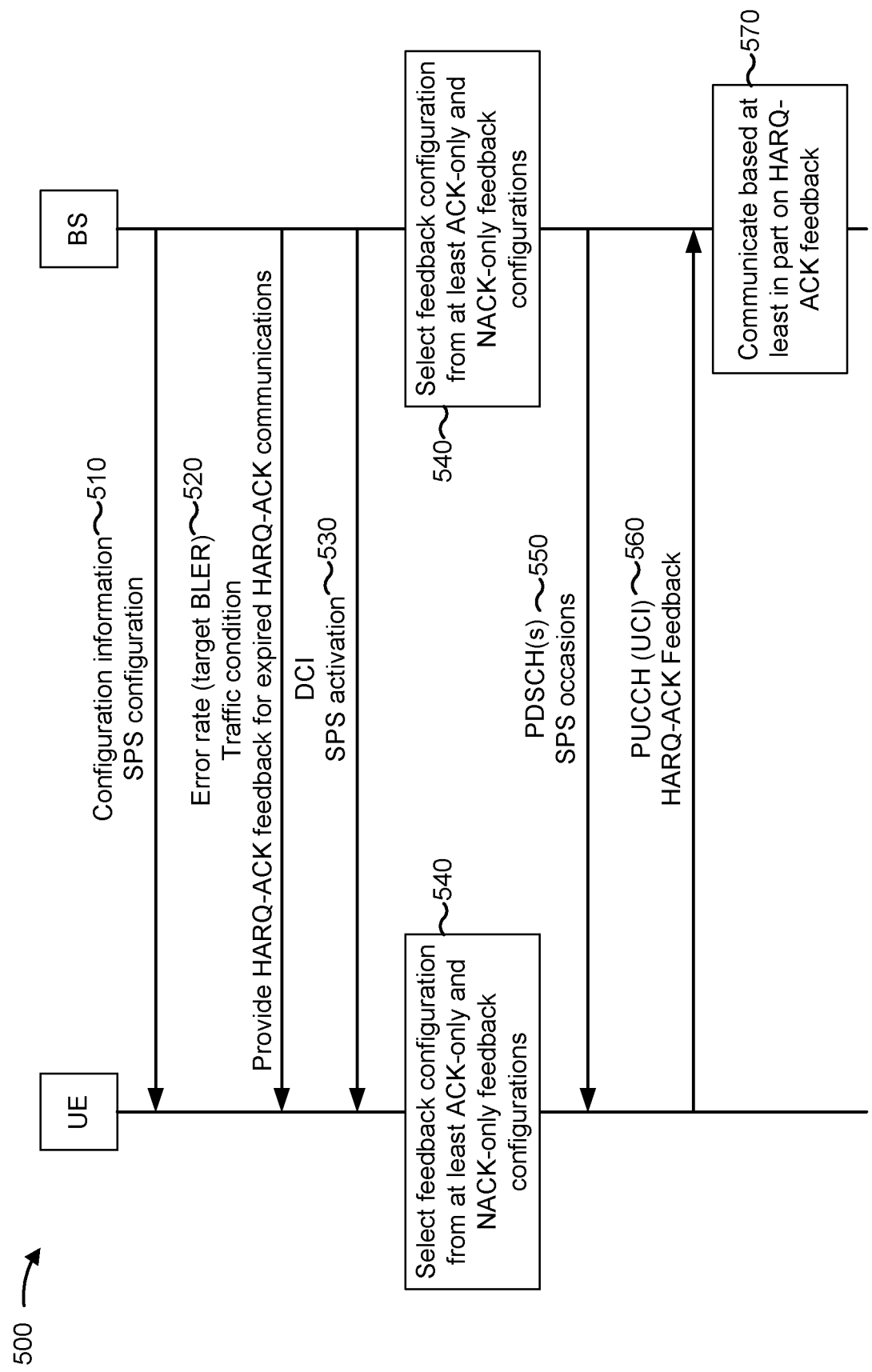
FIG. 5 is a diagram illustrating an example of signaling based at least in part on selection of a feedback configuration from at least an ACK-only and a NACK-only feedback configuration, in accordance with the present disclosure.

FIG. 5 is a diagram illustrating an example 500 of signaling based at least in part on selection of a feedback configuration from at least an ACK-only and a NACK-only feedback configuration, in accordance with the present disclosure. As shown, example 500 includes a UE (e.g., UE 120) and a BS (e.g., BS 110).

As shown in FIG. 5, and by reference number 510, the UE may receive configuration information that indicates an SPS configuration (e.g., one or more SPS configurations). The configuration information is described in more detail in connection with FIG. 3. In some aspects, the configuration information may indicate one or more parameters associated with selecting a feedback configuration from at least an ACK-only feedback configuration or a NACK-only feedback configuration, such as a rule for performing a selection, a window size (e.g., M) for performing the selection, an error rate, or the like.

As shown by reference number 520, the UE may receive information indicating one or more of an error rate (e.g., X), a traffic condition, or whether to provide HARQ-ACK feedback for expired HARQ-ACK communications (e.g., HARQ-ACK packets). In some aspects, at least part of the information shown by reference number 520 may be received with other information of FIG. 5 (such as the configuration information shown by reference number 510 or the DCI shown by reference number 530). The information shown by reference number 520 can be transmitted via RRC signaling, MAC signaling, DCI signaling, or the like.

As mentioned, in some aspects, the UE may receive information indicating an error rate X. For example, the UE may receive information indicating a traffic type associated with an SPS configuration (e.g., via RRC signaling, medium access control (MAC) signaling, DCI, or the like), and may determine the error rate based at least in part on the traffic type. In some aspects, the UE may receive information indicating a target BLER, where the error rate is defined by the target BLER. In some aspects, the UE may determine the error rate. For example, the UE 120 may determine the error rate based at least in part on the SPS configuration. More particularly, the SPS configuration may be associated with (e.g., configured with) an error rate, and the UE may identify the error rate based at least in part on the SPS configuration if the SPS configuration is activated.

As mentioned, in some aspects, the UE may receive information indicating a traffic condition. The traffic condition may indicate a number of non-empty SPS occasions K (or a number of empty SPS occasions K−1) in a window of M SPS occasions. In some aspects, the UE may receive (e.g., via DCI or the like) a bitmap indicating the traffic condition. For example, the bitmap may include values indicating non-empty SPS occasions and/or empty SPS occasions of the window of M SPS occasions. In some aspects, the BS may provide an implicit indication via a bitmap. For example, for a value of M, a bitmap of size M may be used, and from that bitmap K can be determined. M may be signaled via RRC, a MAC-CE, DCI (e.g., activation or deactivation DCI), or the like, or indicating the number of non-empty occasions (since, from a total (in a traffic window) of M and non-empty occasions K, the UE can determine the number of empty occasions, so it is enough to use M and an indication of K. M can be provided via RRC or MAC-CE (or even activation/deactivation DCI) and K can be provided via activation/deactivation DCI. For example, the determination of M may be a function of a gNB scheduler and/or may be based at least in part on a capability of the gNB scheduler for modeling future traffic. Thus, in some aspects, M may be semi-statically configured. This is in addition to target BLER.

In some aspects, the UE may receive (e.g., via DCI or the like) information indicating a number of non-empty SPS occasions K. For example, the information may indicate a value of K. In some aspects, the BS may provide the information indicating the traffic condition every M SPS occasions. For example, M may be based at least in part on a size of window in which a BS can predict traffic conditions or make a decision on scheduling. Thus, the BS can dynamically signal K (or K−1), which enables the UE and/or the BS to perform dynamic selection of the selected feedback configuration.

As mentioned, in some aspects, the UE may receive information indicating whether to provide no HARQ-ACK feedback for expired HARQ-ACK communications. For example, a HARQ-ACK communication (e.g., HARQ-ACK feedback) may relate to a downlink communication, which may be associated with a latency requirement. If the HARQ-ACK communication is not transmitted quickly enough after reception of (or failure to receive) the downlink communication, then it may be impossible for the BS to satisfy the latency requirement of the downlink communication. Such a HARQ-ACK communication may be referred to as an expired HARQ-ACK communication. By indicating that the UE can provide no HARQ-ACK feedback for expired HARQ-ACK communications, the BS may conserve signaling resources that would otherwise be used for expired HARQ-ACK communications.

As shown by reference number 530, the BS may transmit, to the UE, activation DCI. The activation DCI may indicate that an SPS configuration is to be activated. In some aspects, the activation DCI may indicate one or more of the parameters described above with regard to reference number 520. The activation DCI is described in more detail in connection with FIG. 3. In some aspects, the activation DCI may include reactivation DCI.

As shown by reference number 540, the UE and/or the BS may select a feedback configuration, from at least an ACK-only feedback configuration and a NACK-only feedback configuration. For example, the UE may select the feedback configuration (referred to herein as a selected feedback configuration) for an SPS resource allocation based at least in part on the traffic condition and the error rate. As another example, the BS may select the feedback configuration for the SPS resource allocation based at least in part on the traffic condition and the error rate and may signal the selected feedback configuration to the UE (e.g., via DCI or the like), which may be referred to as implicit indication. In some aspects, the BS may signal, to the UE, whether to use an ACK/NACK feedback configuration (e.g., in which the UE provides both ACKs and NACKs) or a single feedback configuration (e.g., an ACK-only feedback configuration or a NACK-only feedback configuration). In this case, if a single feedback configuration is to be used, the UE and/or the BS may determine which single feedback configuration to use based at least in part on the techniques and apparatuses described herein. In some aspects, the UE may select the feedback configuration from an ACK-only feedback configuration, a NACK-only feedback configuration, an ACK/NACK feedback configuration, and/or one or more other feedback configurations.

Generally, the UE and/or the BS may select the feedback configuration based at least in part on the error rate and the traffic condition. In some aspects, the UE and/or the BS may select the feedback configuration based at least in part on which feedback configuration, of at least the ACK-only feedback configuration and the NACK-only feedback configuration, would lead to a smaller number of HARQ-ACK feedback transmissions, a lower overhead associated with HARQ-ACK feedback transmission (e.g., based at least in part on a total number of feedback bits or a total number of feedback messages), or the like.

For example, consider a set of K non-empty SPS occasions in a window of M SPS occasions with an error rate of X. If ACK-only feedback is used, then, at most, K feedbacks are expected (for a total of 0 to K ACK/NACKs). If NACK-only feedback is used, then (M−K) dummy NACKs for skipped SPS occasions (e.g., PDSCH occasions) +K potential NACKs (if data decoding fails for actual data transmissions of the non-empty SPS occasions) (for a total of M−K to M ACK/NACKs).

For an error rate of X (e.g., a target BLER of X), the worst-case scenario (e.g., the maximum number of ACK/NACKs) for an ACK-only feedback configuration may be represented by F1, wherein $F1=K*(1-X)^K$. For an error rate of X (e.g., a target BLER of X), the worst-case scenario (e.g., the maximum number of ACK/NACKs) for a NACK-only feedback configuration may be represented by F2, wherein $F2=(M-K)+K*X^K$. The UE or the BS may select the feedback configuration based at least in part on comparing F1 and F2. For example, if F1 is associated with a higher maximum number of ACK/NACKs than F2, then the UE may select the NACK-only approach, which reduces the number of likely ACK/NACKs, thereby reducing overhead.

It can be seen that, if K=M (e.g., every SPS occasion is non-empty), then F1 equals $M*(1-X)^M$ for the ACK-only feedback configuration and F2 equals $M*X^M$ for the NACK-only feedback configuration. Thus, the NACK-only feedback configuration may be selected, since the number of potential ACK/NACKs is higher for the ACK-only feedback configuration when X<<1 (e.g., for eMBB or URLLC services).

If X is equal to or substantially 0 (signifying a very low BLER and a very high first transmission reliability, such as for URLLC services), then F1 equals K for the ACK-only feedback configuration while F2 equals (M−K) for the NACK-only feedback configuration. In this case, the selection of the ACK-only feedback configuration or the NACK-only feedback configuration (e.g., the discriminator for this selection) is based at least in part on how many non-empty or empty SPS occasions are in the window. For example, if K>M−K (i.e., K>M/2), then the UE or the BS may select NACK-only feedback. If K<M/2, then the UE or the BS may use ACK-only feedback. If K=M/2, then either feedback configuration can be used. In some aspects, if K=M/2 and X is equal to or substantially equal to zero, the BS can select a feedback configuration and indicate which feedback configuration to use.

As an example, consider a case where M=6, X=0.1. For values of K={1 2 3 4 5 6}, F1 may be equal to {0.9000 1.6200 2.1870 2.6244 2.9525 3.1886}, and F2 may be equal to {5.1000 4.0200 3.0030 2.0004 1.0001 0.0000}. Thus, the UE or the BS may select the ACK-only feedback configuration for K values of 1, 2, and 3, and may select the NACK-only feedback configuration for K values of 4, 5, and 6.

As another example, consider a case where M=10, X=0.1. For values of K={1 2 3 4 5 6 7 8 9 10}, F1 may be equal to {0.9000 1.6200 2.1870 2.6244 2.9525 3.1886 3.3481 3.4437 3.4868 3.4868}, and F2 may be equal to {9.1000 8.0200 7.0030 6.0004 5.0000 4.0000 3.0000 2.0000 1.0000 0.0000}. Thus, the UE or the BS may select the ACK-only feedback configuration for K values of 1 through 6 and may select the NACK-only feedback configuration for K values of 7 through 10.

As yet another example, consider a case where M=15, X=0.1. For values of K={1 2 3 4 5 6 7 8 9 10 11 12 13 14 15}, F1 may be equal to {0.9000 1.6200 2.1870 2.6244 2.9525 3.1886 3.3481 3.4437 3.4868 3.4868 4.4519 3.3892 3.3044 3.2028 3.0884}, and F2 may be equal to {14.1000 13.0200 12.0030 11.0004 10.0000 9.0000 8.0000 7.0000 6.0000 5.0000 4.0000 3.0000 2.0000 1.0000 0.0000}. Thus, the UE or the BS may select the ACK-only feedback configuration for K values of 1 through 11 and may select the NACK-only feedback configuration for K values of 12 through 15.

As still another example, consider a case where M=15, X=0.01. For values of K={1 2 3 4 5 6 7 8 9 10 11 12 13 14 15}, F1 may be equal to {0.9900 1.9602 2.9109 3.8424 4.7550 5.6489 6.5245 7.3820 8.2217 9.0438 9.8487 10.6366 11.4078 12.1624 12.9009}, and F2 may be equal to {14.0100 13.0002 12.0000 11.0000 10.0000 9.0000 8.0000 7.0000 6.0000 5.0000 4.0000 3.0000 2.0000 1.0000 0.0000}. Thus, the UE or the BS may select the ACK-only feedback configuration for K values of 1 through 7 and may select the NACK-only feedback configuration for K values of 8 through 15. Thus, for values of X approaching zero, K and (M−K) control the number of potential ACKs and potential NACKs.

Another approach for selecting the feedback configuration is based at least in part on respective average numbers of ACKs and NACKs associated with the ACK-only and NACK-only feedback configurations. For example, let F1 represent the average number of ACKs within a window of M SPS occasions and let F2 represent the average number of NACKs within the window of M SPS occasions. In this case, $F1=\Sigma_{m=1}^{K} m (1-X)^m X^{K-m}$, and $F2=(M-K)+\Sigma_{m=1}^{K} m (1-X)^{K-m} X^m$. Then, the UE or the BS may select the feedback configuration associated with the lower value of F1 and F2.

As shown by reference number 550, the UE may receive, from the BS, zero or more PDSCHs on one or more SPS occasions. For example, the UE may monitor M SPS occasions within a window based at least in part on the configuration information and the activation DCI. The UE may determine HARQ-ACK feedback based at least in part on monitoring the one or more SPS occasions. For example, the UE may selectively determine ACK feedback, NACK feedback, or both ACK and NACK feedback based at least in part on the selected feedback configuration.

As shown by reference number 560, the UE may transmit HARQ-ACK feedback on a PUCCH. For example, the HARQ-ACK feedback may be based at least in part on the selected feedback configuration. In some aspects, the UE may selectively transmit (or omit) feedback regarding expired HARQ-ACK communications based at least in part on the information shown by reference number 520. By selecting the selected feedback configuration based at least in part on the error rate and the traffic condition, the UE and/or the BS can reduce overhead and improve utilization of communication resources. Furthermore, the determination of the selected feedback configuration may be dynamic (e.g., at the granularity of the window of M SPS occasions), which improves adaptability in changing traffic conditions and improves communication resource utilization relative to static or semi-static selection of a selected feedback configuration. As shown by reference number 570, the BS may communicate based at least in part on the HARQ-ACK feedback. For example, the BS may selectively retransmit a communication, activate another SPS configuration, deactivate the activated SPS configuration, or the like.

As indicated above, FIG. 5 is provided as an example. Other examples may differ from what is described with regard to FIG. 5.

Figure 6:
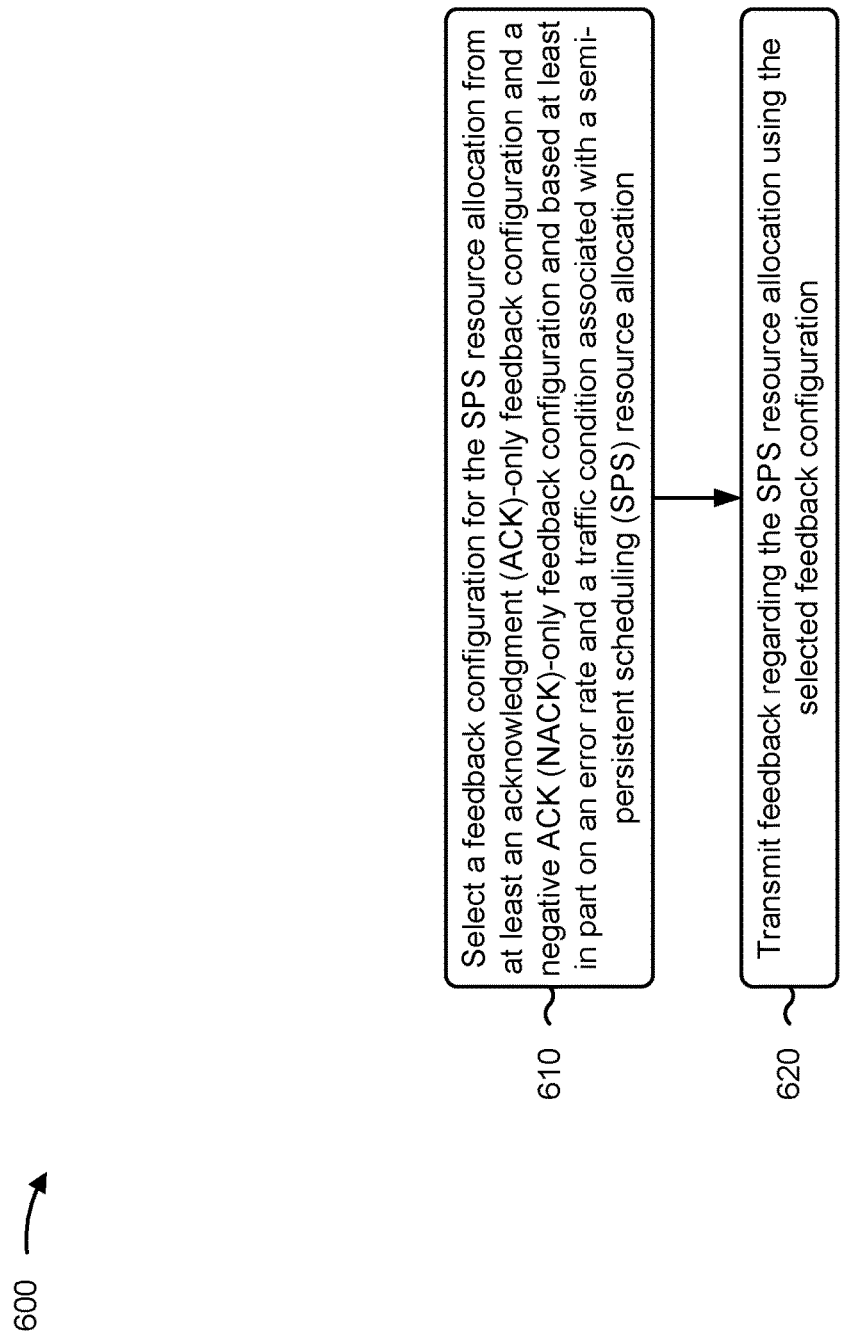
FIGS. 6-7 are diagrams illustrating example processes associated with ACK-only or NACK-only feedback selection for semi-persistent scheduling configurations, in accordance with the present disclosure.

FIG. 6 is a diagram illustrating an example process 600 performed, for example, by a UE, in accordance with the present disclosure. Example process 600 is an example where the UE (e.g., UE 120) performs operations associated with NACK-only or ACK-only feedback selection for SPS scheduling configurations.

As shown in FIG. 6, in some aspects, process 600 may include selecting a feedback configuration for the SPS resource allocation from at least an ACK-only feedback configuration and a NACK-only feedback configuration and based at least in part on an error rate and a traffic condition associated with a SPS resource allocation (block 610). For example, the UE (e.g., using selection component 808, depicted in FIG. 8) may select, from at least an ACK-only feedback configuration and a NACK-only feedback configuration and based at least in part on an error rate and a traffic condition associated with an SPS resource allocation, a feedback configuration for the SPS resource allocation, as described above, for example, with reference to FIGS. 3, 4, and/or 5.

As further shown in FIG. 6, in some aspects, process 600 may include transmitting feedback regarding the SPS resource allocation using the selected feedback configuration (block 620). For example, the UE (e.g., using transmission component 804, depicted in FIG. 8) may transmit feedback regarding the SPS resource allocation using the selected feedback configuration, as described above, for example, with reference to FIGS. 3, 4, and/or 5.

Process 600 may include additional aspects, such as any single aspect or any combination of aspects described below and/or in connection with one or more other processes described elsewhere herein.

In a first aspect, the traffic condition indicates a number of non-empty SPS occasions of the SPS resource allocation.

In a second aspect, alone or in combination with the first aspect, the error rate is a target BLER for the SPS resource allocation.

In a third aspect, alone or in combination with the second aspect, process 600 includes receiving information indicating the target BLER via at least one of radio resource control signaling, medium access control signaling, or downlinking control information.

In a fourth aspect, alone or in combination with one or more of the first through second aspects, process 600 includes determining the error rate based at least in part on an SPS configuration associated with the SPS resource allocation, wherein the SPS configuration is configured with the error rate.

In a fifth aspect, alone or in combination with one or more of the first through fourth aspects, selecting the feedback configuration is based at least in part on whether a larger number of feedback transmissions for the SPS resource allocation would be performed using the ACK-only feedback configuration or the NACK-only feedback configuration.

In a sixth aspect, alone or in combination with one or more of the first through fifth aspects, the SPS resource allocation is associated with a window, and selecting the feedback configuration is performed dynamically for the window.

In a seventh aspect, alone or in combination with one or more of the first through sixth aspects, process 600 includes receiving information indicating the traffic condition.

In an eighth aspect, alone or in combination with the seventh aspect, the information indicating the traffic condition includes a bitmap indicating whether a set of SPS occasions of the SPS resource allocation are empty.

In a ninth aspect, alone or in combination with the seventh aspect, the information indicating the traffic condition includes information indicating at least one of a number of empty SPS occasions of the SPS resource allocation or a number of non-empty SPS occasions of the SPS resource allocation.

In a tenth aspect, alone or in combination with one or more of the first through ninth aspects, process 600 includes receiving information indicating the error rate.

In an eleventh aspect, alone or in combination with the tenth aspect, the information indicating the error rate is received via at least one of radio resource control signaling, medium access control signaling, or downlinking control information.

In a twelfth aspect, alone or in combination with one or more of the first through eleventh aspects, the SPS resource allocation includes M SPS occasions, the traffic condition indicates a number of non-empty SPS occasions K of the M SPS occasions, and the error rate indicates a target block error rate (BLER) X, and the selected feedback configuration is selected based at least in part on K, M, and X.

In a thirteenth aspect, alone or in combination with the twelfth aspect, F1 equals $K*(1-X)^K$, wherein F2 equals $(M-K)+K*X^K$, and wherein the selected feedback configuration is selected based at least in part on comparing F1 and F2.

In a fourteenth aspect, alone or in combination with one or more of the first through thirteenth aspects, process 600 includes receiving an indication of the selected feedback configuration based at least in part on F1 being equal to F2.

In a fifteenth aspect, alone or in combination with one or more of the first through fourteenth aspects, process 600 includes receiving information indicating the selected feedback configuration, wherein selecting the feedback configuration is based at least in part on the information indicating the selected feedback configuration.

In a sixteenth aspect, alone or in combination with one or more of the first through fifteenth aspects, process 600 includes receiving, based at least in part on a window associated with the SPS resource allocation, information indicating whether to provide hybrid automatic repeat request (ACK) feedback for expired HARQ-ACK communications.

In a seventeenth aspect, alone or in combination with one or more of the first through sixteenth aspects, an average number of ACKSs within a window of M SPS occasions is equal to $F1=\Sigma_{m=1}^{K} m\ (1-X)^m X^{K-m}$, wherein an average number of NACKs within the window of M SPS occasions is equal to $F2=(M-K)+\Sigma_{m=1}^{K} m\ (1-X)^{K-m} X^m$, and wherein the selected feedback configuration is selected based at least in part on comparing F1 and F2.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
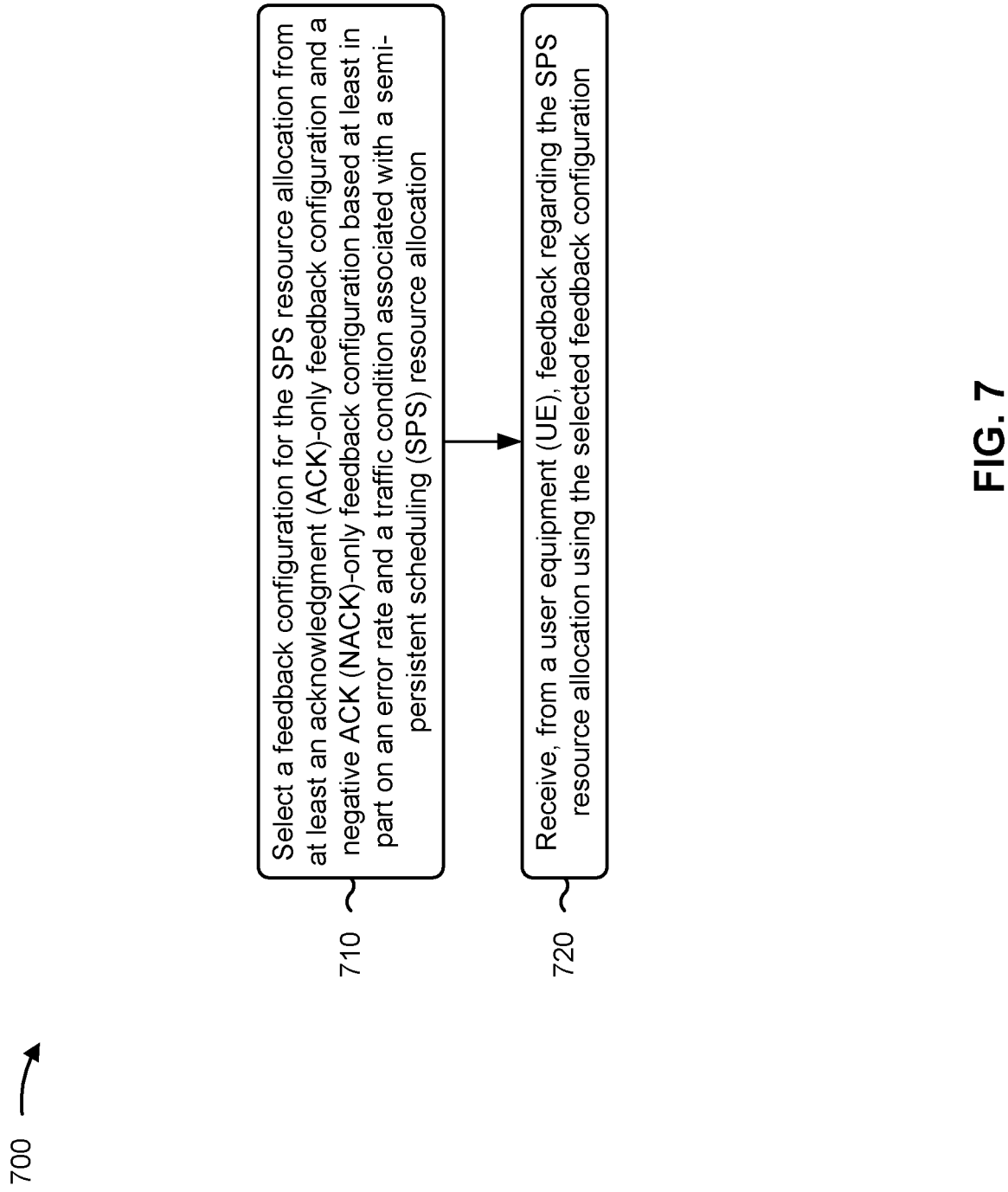

FIG. 7 is a diagram illustrating an example process 700 performed, for example, by a base station, in accordance with the present disclosure. Example process 700 is an example where the base station (e.g., base station 110) performs operations associated with NACK-only or ACK-only feedback selection for semi-persistent scheduling configurations.

As shown in FIG. 7, in some aspects, process 700 may include selecting a feedback configuration for the SPS resource allocation from at least an ACK-only feedback configuration and a NACK-only feedback configuration based at least in part on an error rate and a traffic condition associated with an SPS resource allocation (block 710). For example, the base station (e.g., using selection component 908, depicted in FIG. 9) may select, from at least an ACK-only feedback configuration and a NACK-only feedback configuration based at least in part on an error rate and a traffic condition associated with an SPS resource allocation, a feedback configuration for the SPS resource allocation, as described above, for example, with reference to FIGS. 3, 4, and/or 5.

As further shown in FIG. 7, in some aspects, process 700 may include receiving, from a user equipment (UE), feedback regarding the SPS resource allocation using the selected feedback configuration (block 720). For example, the base station (e.g., using reception component 902, depicted in FIG. 9) may receive, from a UE, feedback regarding the SPS resource allocation using the selected feedback configuration, as described above, for example, with reference to FIGS. 3, 4, and/or 5.

Process 700 may include additional aspects, such as any single aspect or any combination of aspects described below and/or in connection with one or more other processes described elsewhere herein.

In a first aspect, the traffic condition indicates a number of non-empty SPS occasions of the SPS resource allocation.

In a second aspect, alone or in combination with the first aspect, the error rate is a target BLER for the SPS resource allocation.

In a third aspect, alone or in combination with the second aspect, process 700 includes transmitting information indicating the target BLER via at least one of radio resource control signaling, medium access control signaling, or downlinking control information.

In a fourth aspect, alone or in combination with one or more of the first through third aspects, process 700 includes determining the error rate based at least in part on an SPS configuration associated with the SPS resource allocation, wherein the SPS configuration is configured with the error rate.

In a fifth aspect, alone or in combination with one or more of the first through fourth aspects, selecting the feedback configuration is based at least in part on whether a larger number of feedback transmissions for the SPS resource allocation would be received using the ACK-only feedback configuration or the NACK-only feedback configuration.

In a sixth aspect, alone or in combination with one or more of the first through fifth aspects, the SPS resource allocation is associated with a window, and selecting the feedback configuration is performed dynamically for the window.

In a seventh aspect, alone or in combination with one or more of the first through sixth aspects, process 700 includes transmitting information indicating the traffic condition.

In an eighth aspect, alone or in combination with the seventh aspect, the information indicating the traffic condition includes a bitmap indicating whether a set of SPS occasions of the SPS resource allocation are empty.

In a ninth aspect, alone or in combination with one or more of the first through eighth aspects, the information indicating the traffic condition includes information indicating at least one of a number of empty SPS occasions of the SPS resource allocation or a number of non-empty SPS occasions of the SPS resource allocation.

In a tenth aspect, alone or in combination with one or more of the first through ninth aspects, process 700 includes transmitting information indicating the error rate.

In an eleventh aspect, alone or in combination with the tenth aspect, the information indicating the error rate is transmitted via at least one of radio resource control signaling, medium access control signaling, or downlinking control information.

In a twelfth aspect, alone or in combination with one or more of the first through eleventh aspects, the SPS resource allocation includes M SPS occasions, the traffic condition indicates a number of non-empty SPS occasions K of the M SPS occasions, and the error rate indicates a target block error rate (BLER) X, and the selected feedback configuration is selected based at least in part on K, M, and X.

In a thirteenth aspect, alone or in combination with the twelfth aspect, F1 equals $K*(1-X)^K$, wherein F2 equals $(M-K)+K*X^K$, and wherein the selected feedback configuration is selected based at least in part on comparing F1 and F2.

In a fourteenth aspect, alone or in combination with the thirteenth aspect, process 700 includes transmitting an indication of the selected feedback configuration based at least in part on F1 being equal to F2.

In a fifteenth aspect, alone or in combination with one or more of the first through fourteenth aspects, process 700 includes transmitting information indicating the selected feedback configuration.

In a sixteenth aspect, alone or in combination with one or more of the first through fifteenth aspects, process 700 includes transmitting, based at least in part on a window associated with the SPS resource allocation, information indicating whether to provide HARQ-ACK feedback for expired HARQ-ACK communications.

In a seventeenth aspect, alone or in combination with one or more of the first through sixteenth aspects, an average number of ACKSs within a window of M SPS occasions is equal to $F1 = \Sigma_{m-1}^{K} m \, (1-X)^m X^{K-m}$, wherein an average number of NACKs within the window of M SPS occasions is equal to $F2=(M-K)+\Sigma_{m=1}^{K} m \, (1-X)^{K-m} X^m$, and wherein the selected feedback configuration is selected based at least in part on comparing F1 and F2.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
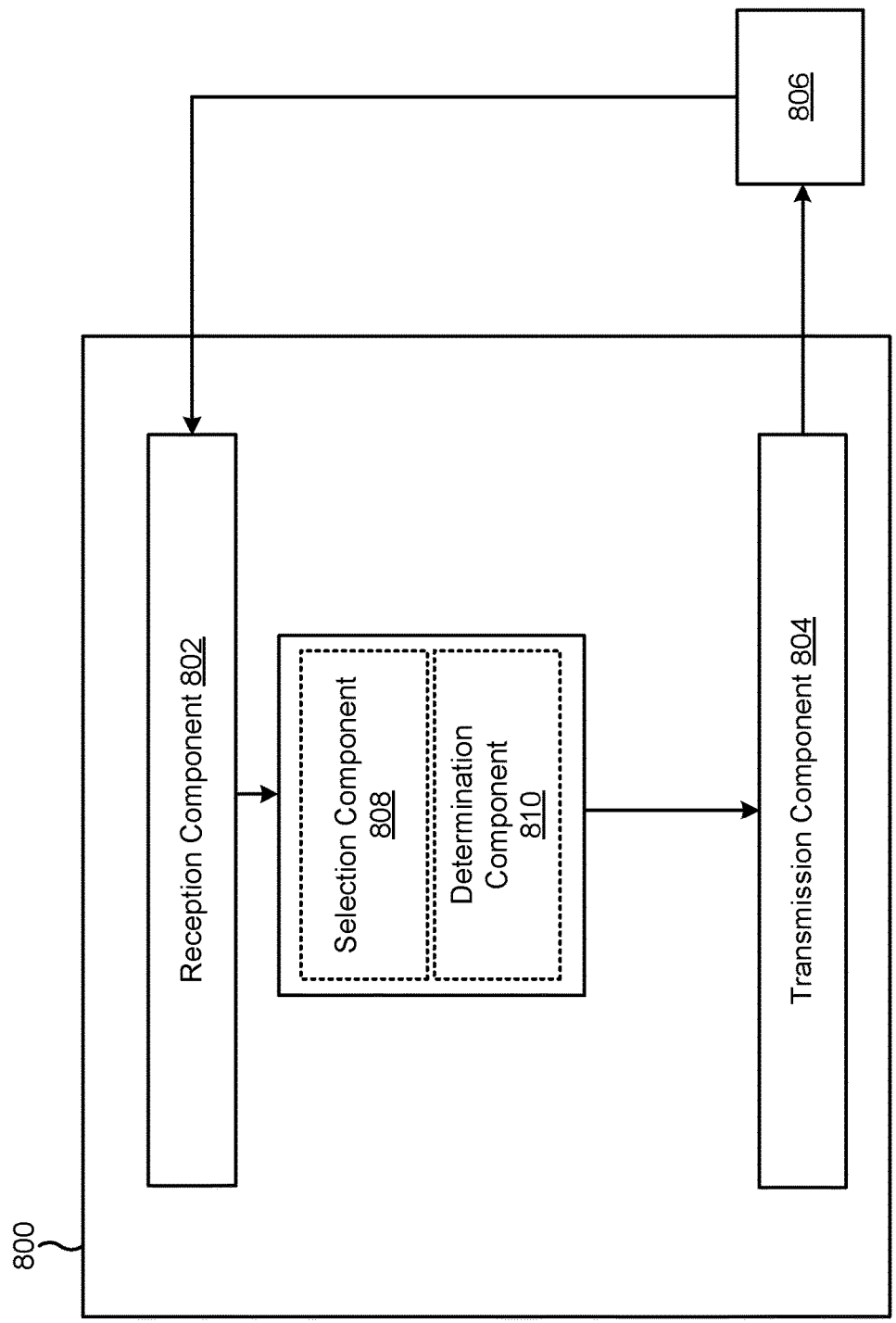
FIGS. 8-9 are block diagrams of example apparatuses for wireless communication, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of a selection component 808 or a determination component 810, among other examples.

In some aspects, the apparatus 800 may be configured to perform one or more operations described herein in connection with FIGS. 3-5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The selection component 808 may select, from at least an ACK-only feedback configuration and a NACK-only feedback configuration and based at least in part on an error rate and a traffic condition associated with an SPS resource allocation, a feedback configuration for the SPS resource allocation. The transmission component 804 may transmit feedback regarding the SPS resource allocation using the selected feedback configuration.

The reception component 802 may receive information indicating the target BLER via at least one of radio resource control signaling, medium access control signaling, or downlink control information.

The determination component 810 may determine the error rate based at least in part on an SPS configuration associated with the SPS resource allocation, wherein the SPS configuration is configured with the error rate.

The reception component 802 may receive information indicating the traffic condition.

The reception component 802 may receive information indicating the error rate.

The reception component 802 may receive an indication of the selected feedback configuration based at least in part on F1 being equal to F2.

The reception component 802 may receive information indicating the selected feedback configuration, wherein selecting the feedback configuration is based at least in part on the information indicating the selected feedback configuration.

The reception component 802 may receive, based at least in part on a window associated with the SPS resource allocation, information indicating whether to provide HARQ-ACK feedback for expired HARQ-ACK communications.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
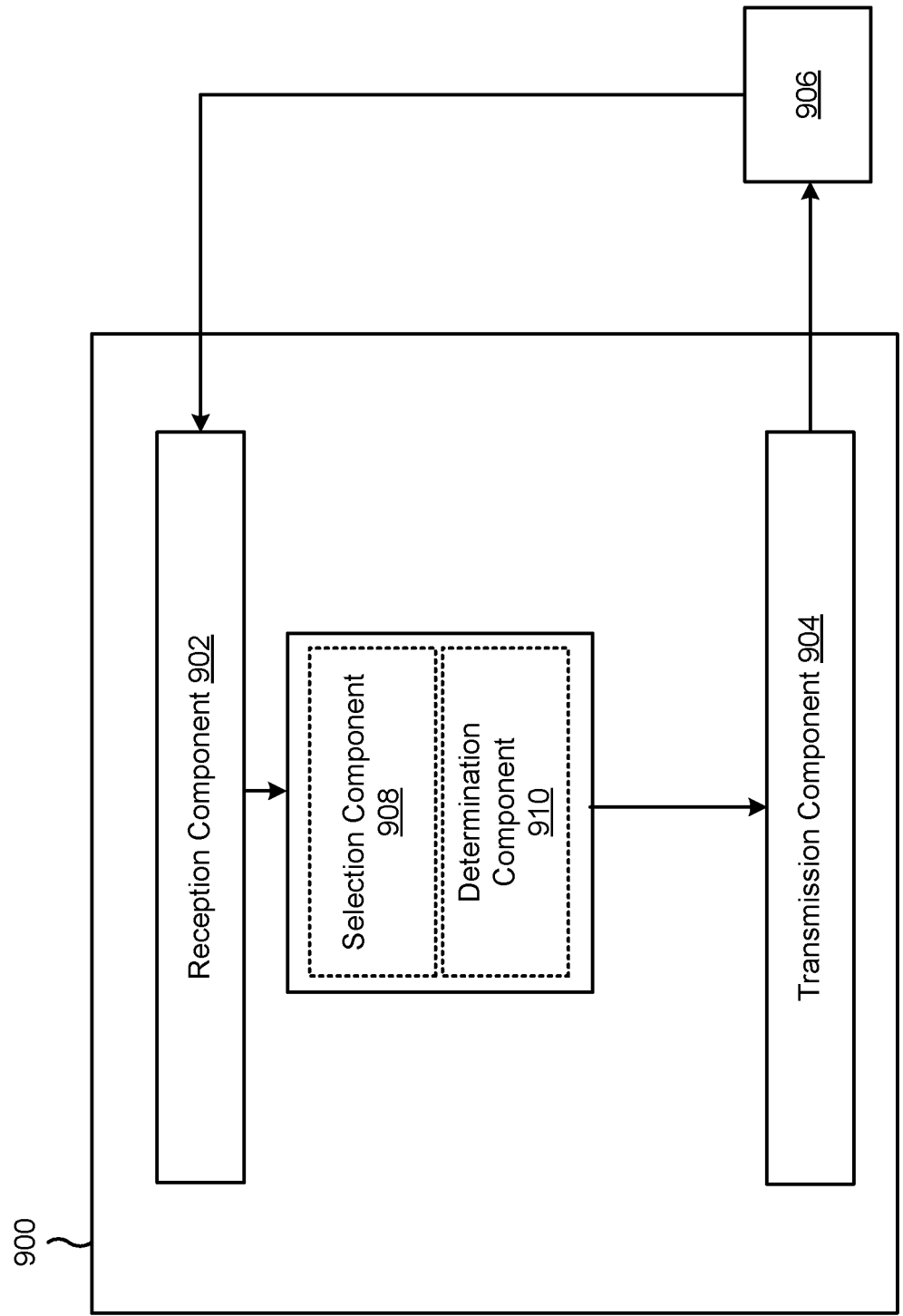

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a selection component 908 and/or a determination component 910, among other examples.

In some aspects, the apparatus 900 may be configured to perform one or more operations described herein in connection with FIGS. 3-5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

The selection component 908 may select, from at least an ACK-only feedback configuration and a NACK-only feedback configuration based at least in part on an error rate and a traffic condition associated with an SPS resource allocation, a feedback configuration for the SPS resource allocation. The reception component 902 may receive, from a UE, feedback regarding the SPS resource allocation using the selected feedback configuration.

The transmission component 904 may transmit information indicating the target BLER via at least one of radio resource control signaling, medium access control signaling, or downlink control information.

The determination component 910 may determine the error rate based at least in part on an SPS configuration associated with the SPS resource allocation, wherein the SPS configuration is configured with the error rate.

The transmission component 904 may transmit information indicating the traffic condition.

The transmission component 904 may transmit information indicating the error rate.

The transmission component 904 may transmit an indication of the selected feedback configuration based at least in part on F1 being equal to F2.

The transmission component 904 may transmit information indicating the selected feedback configuration.

The transmission component 904 may transmit, based at least in part on a window associated with the SPS resource allocation, information indicating whether to provide HARQ-ACK feedback for expired HARQ-ACK communications.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: selecting, from at least an acknowledgment (ACK)-only feedback configuration and a negative ACK (NACK)-only feedback configuration and based at least in part on an error rate and a traffic condition associated with a semi-persistent scheduling (SPS) resource allocation, a feedback configuration for the SPS resource allocation; and transmitting feedback regarding the SPS resource allocation using the selected feedback configuration.

Aspect 2: The method of Aspect 1, wherein the traffic condition indicates a number of non-empty SPS occasions of the SPS resource allocation.

Aspect 3: The method of any of Aspects 1-2, wherein the error rate is a target block error rate (BLER) for the SPS resource allocation.

Aspect 4: The method of Aspect 3, further comprising: receiving information indicating the target BLER via at least one of: radio resource control signaling, medium access control signaling, or downlink control information.

Aspect 5: The method of any of Aspects 1-4, further comprising: determining the error rate based at least in part on an SPS configuration associated with the SPS resource allocation, wherein the SPS configuration is configured with the error rate.

Aspect 6: The method of any of Aspects 1-5, wherein selecting the feedback configuration is based at least in part on whether a larger number of feedback transmissions for the SPS resource allocation would be performed using the ACK-only feedback configuration or the NACK-only feedback configuration.

Aspect 7: The method of any of Aspects 1-6, wherein the SPS resource allocation is associated with a window, and wherein selecting the feedback configuration is performed dynamically for the window.

Aspect 8: The method of any of Aspects 1-7, further comprising: receiving information indicating the traffic condition.

Aspect 9: The method of Aspect 8, wherein the information indicating the traffic condition includes a bitmap indicating whether a set of SPS occasions of the SPS resource allocation are empty.

Aspect 10: The method of Aspect 8, wherein the information indicating the traffic condition includes information indicating at least one of a number of empty SPS occasions of the SPS resource allocation or a number of non-empty SPS occasions of the SPS resource allocation.

Aspect 11: The method of any of Aspects 1-10, further comprising: receiving information indicating the error rate.

Aspect 12: The method of Aspect 11, wherein the information indicating the error rate is received via at least one of: radio resource control signaling, medium access control signaling, or downlink control information.

Aspect 13: The method of any of Aspects 1-12, wherein the SPS resource allocation includes M SPS occasions, the traffic condition indicates a number of non-empty SPS occasions K of the M SPS occasions, and the error rate indicates a target block error rate (BLER) X, and wherein the selected feedback configuration is selected based at least in part on K, M, and X.

Aspect 14: The method of Aspect 13, wherein F1 equals $K*(1-X)K$, wherein F2 equals $(M-K)+K*XK$, and wherein the selected feedback configuration is selected based at least in part on comparing F1 and F2.

Aspect 15: The method of Aspect 14, further comprising: receiving an indication of the selected feedback configuration based at least in part on F1 being equal to F2.

Aspect 16: The method of any of Aspects 1-15, further comprising: receiving information indicating the selected feedback configuration, wherein selecting the feedback configuration is based at least in part on the information indicating the selected feedback configuration.

Aspect 17: The method of any of Aspects 1-16, further comprising: receiving, based at least in part on a window associated with the SPS resource allocation, information indicating whether to provide hybrid automatic repeat request (ACK) feedback for expired HARQ-ACK communications.

Aspect 18: A method of wireless communication performed by a base station, comprising: selecting, from at least an acknowledgment (ACK)-only feedback configuration and a negative ACK (NACK)-only feedback configuration based at least in part on an error rate and a traffic condition associated with a semi-persistent scheduling (SPS) resource allocation, a feedback configuration for the SPS resource allocation; and receiving, from a user equipment (UE), feedback regarding the SPS resource allocation using the selected feedback configuration.

Aspect 19: The method of Aspect 18, wherein the traffic condition indicates a number of non-empty SPS occasions of the SPS resource allocation.

Aspect 20: The method of any of Aspects 18-19, wherein the error rate is a target block error rate (BLER) for the SPS resource allocation.

Aspect 21: The method of Aspect 20, further comprising: transmitting information indicating the target BLER via at least one of: radio resource control signaling, medium access control signaling, or downlink control information.

Aspect 22: The method of any of Aspects 18-21, further comprising: determining the error rate based at least in part on an SPS configuration associated with the SPS resource allocation, wherein the SPS configuration is configured with the error rate.

Aspect 23: The method of any of Aspects 18-22, wherein selecting the feedback configuration is based at least in part on whether a larger number of feedback transmissions for the SPS resource allocation would be received using the ACK-only feedback configuration or the NACK-only feedback configuration.

Aspect 24: The method of any of Aspects 18-23, wherein the SPS resource allocation is associated with a window, and wherein selecting the feedback configuration is performed dynamically for the window.

Aspect 25: The method of any of Aspects 18-24, further comprising: transmitting information indicating the traffic condition.

Aspect 26: The method of Aspect 25, wherein the information indicating the traffic condition includes a bitmap indicating whether a set of SPS occasions of the SPS resource allocation are empty.

Aspect 27: The method of Aspect 25, wherein the information indicating the traffic condition includes information indicating at least one of a number of empty SPS occasions of the SPS resource allocation or a number of non-empty SPS occasions of the SPS resource allocation.

Aspect 28: The method of any of Aspects 18-27, further comprising: transmitting information indicating the error rate.

Aspect 29: The method of Aspect 28, wherein the information indicating the error rate is transmitted via at least one of: radio resource control signaling, medium access control signaling, or downlink control information.

Aspect 30: The method of any of Aspects 18-29, wherein the SPS resource allocation includes M SPS occasions, the traffic condition indicates a number of non-empty SPS occasions K of the M SPS occasions, and the error rate indicates a target block error rate (BLER) X, and wherein the selected feedback configuration is selected based at least in part on K, M, and X.

Aspect 31: The method of Aspect 30, wherein F1 equals $K*(1-X)K$, wherein F2 equals $(M-K)+K*XK$, and wherein the selected feedback configuration is selected based at least in part on comparing F1 and F2.

Aspect 32: The method of Aspect 31, further comprising: transmitting an indication of the selected feedback configuration based at least in part on F1 being equal to F2.

Aspect 33: The method of any of Aspects 18-33, further comprising: transmitting information indicating the selected feedback configuration.

Aspect 34: The method of any of Aspects 18-34, further comprising: transmitting, based at least in part on a window associated with the SPS resource allocation, information indicating whether to provide hybrid automatic repeat request (ACK) feedback for expired HARQ-ACK communications.

Aspect 35: An apparatus for wireless communication at a device, comprising a processor; memory coupled with the processor; and instructions stored in the memory and executable by the processor to cause the apparatus to perform the method of one or more of Aspects 1-34.

Aspect 36: A device for wireless communication, comprising a memory and one or more processors coupled to the memory, the one or more processors configured to perform the method of one or more of Aspects 1-34.

Aspect 37: An apparatus for wireless communication, comprising at least one means for performing the method of one or more of Aspects 1-34.

Aspect 38: A non-transitory computer-readable medium storing code for wireless communication, the code comprising instructions executable by a processor to perform the method of one or more of Aspects 1-34.

Aspect 39: A non-transitory computer-readable medium storing a set of instructions for wireless communication, the set of instructions comprising one or more instructions that, when executed by one or more processors of a device, cause the device to perform the method of one or more of Aspects 1-34.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors coupled to the memory, the one or more processors configured to:
select, from an acknowledgment (ACK)-only feedback configuration and a negative ACK (NACK)-only feedback configuration, a feedback configuration for a semi-persistent scheduling (SPS) resource allocation based on an error rate and a traffic condition associated with the SPS resource allocation, wherein:
the SPS resource allocation includes M SPS occasions, M being an integer quantity;
the traffic condition indicates a number of non-empty SPS occasions K of the M SPS occasions, K being an integer quantity;
the error rate indicates a target block error rate (BLER) X, X being a value between zero and one; and
the feedback configuration is selected based on K, M, and X; and
transmit feedback regarding the SPS resource allocation using the feedback configuration that is selected.

2. The UE of claim 1, wherein the one or more processors are further configured to:
receive information indicating the target BLER via at least one of:
radio resource control signaling,
medium access control signaling, or
downlink control information.

3. The UE of claim 1, wherein the one or more processors are further configured to:
determine the error rate based at least in part on an SPS configuration associated with the SPS resource allocation, wherein the SPS configuration is configured with the error rate.

4. The UE of claim 1, wherein selecting the feedback configuration is based on whether a larger number of feedback transmissions for the SPS resource allocation would be performed using the ACK-only feedback configuration or the NACK-only feedback configuration.

5. The UE of claim 1, wherein the SPS resource allocation is associated with a window, and wherein selecting the feedback configuration is performed dynamically for the window.

6. The UE of claim 1, wherein the one or more processors are further configured to:
receive information indicating the traffic condition.

7. The UE of claim 6, wherein the information indicating the traffic condition includes a bitmap indicating whether a set of SPS occasions of the SPS resource allocation are empty.

8. The UE of claim 6, wherein the information indicating the traffic condition includes information indicating at least one of a number of empty SPS occasions of the SPS resource allocation or the number of non-empty SPS occasions of the SPS resource allocation.

9. The UE of claim 1, wherein an average number of ACKs within the M SPS occasions F1 equals $K*(1-X)^K$, wherein an average number of NACKs within the M SPS occasions F2 equals $(M-K)+K*X^K$, and wherein the feedback configuration is selected based on comparing F1 and F2.

10. The UE of claim 9, wherein the one or more processors are further configured to:
receive an indication of the feedback configuration that is selected based on F1 being equal to F2.

11. The UE of claim 1, wherein an average number of ACKSs within a window of M SPS occasions is equal to $F1=\Sigma_{m=1}^{K}m\ (1-X)^m x^{K-m}$, wherein an average number of NACKs within the window of M SPS occasions is equal to $F2=(M-K)+\Sigma_{m=1}^{K}m\ (1-X)^{K-m}X^m$, and wherein the feedback configuration is selected based on comparing F1 and F2.

12. The UE of claim 1, wherein the one or more processors are further configured to:
receive information indicating the feedback configuration that is selected, wherein selecting the feedback configuration is based on the information indicating the feedback configuration that is selected.

13. The UE of claim 1, wherein the one or more processors are further configured to:
receive, based on a window associated with the SPS resource allocation, information indicating whether to provide hybrid automatic repeat request (HARQ) feedback for expired HARQ-ACK communications.

14. A base station for wireless communication, comprising:
a memory; and
one or more processors coupled to the memory, the memory and the one or more processors configured to:
select, from an acknowledgment (ACK)-only feedback configuration and a negative ACK (NACK)-only feedback configuration, a feedback configuration for a semi-persistent scheduling (SPS) resource allocation based on an error rate and a traffic condition associated with the SPS resource allocation, wherein:
the SPS resource allocation includes M SPS occasions, M being an integer quantity;
the traffic condition indicates a number of non-empty SPS occasions K of the M SPS occasions, K being an integer quantity;
the error rate indicates a target block error rate (BLER) X, X being a value between zero and one; and
the feedback configuration is selected based on K, M, and X; and
receive, from a user equipment (UE), feedback regarding the SPS resource allocation using the feedback configuration that is selected.

15. The base station of claim 14, wherein the one or more processors are further configured to:
determine the error rate based at least in part on an SPS configuration associated with the SPS resource allocation, wherein the SPS configuration is configured with the error rate.

16. The base station of claim 14, wherein selecting the feedback configuration is based on whether a larger number of feedback transmissions for the SPS resource allocation would be received using the ACK-only feedback configuration or the NACK-only feedback configuration.

17. The base station of claim 14, wherein the SPS resource allocation is associated with a window, and wherein selecting the feedback configuration is performed dynamically for the window.

18. The base station of claim 14, wherein the one or more processors are further configured to:
transmit information indicating the traffic condition.

19. The base station of claim 18, wherein the information indicating the traffic condition includes a bitmap indicating whether a set of SPS occasions of the SPS resource allocation are empty.

20. The base station of claim 14, wherein an average number of ACKs within the M SPS occasions F1 equals $K*(1-X)^K$, wherein an average number of NACKs within the M SPS occasions F2 equals $(M-K)+K*X^K$, and wherein the feedback configuration is selected based on comparing F1 and F2.

21. A method of wireless communication performed by a user equipment (UE), comprising:
selecting, from an acknowledgment (ACK)-only feedback configuration and a negative ACK (NACK)-only feedback configuration, a feedback configuration for a semi-persistent scheduling (SPS) resource allocation based on an error rate and a traffic condition associated with the SPS resource allocation, wherein:
the SPS resource allocation includes M SPS occasions, M being an integer quantity;
the traffic condition indicates a number of non-empty SPS occasions K of the M SPS occasions, K being an integer quantity;
the error rate indicates a target block error rate (BLER) X, X being a value between zero and one; and
the feedback configuration is selected based on K, M, and X; and
transmitting feedback regarding the SPS resource allocation using the feedback configuration that is selected.

22. The method of claim 21, further comprising:
receiving information indicating the target BLER via at least one of:
radio resource control signaling,
medium access control signaling, or
downlink control information.

23. The method of claim 21, further comprising:
determining the error rate based at least in part on an SPS configuration associated with the SPS resource allocation, wherein the SPS configuration is configured with the error rate.

24. The method of claim 21, wherein selecting the feedback configuration is based on whether a larger number of feedback transmissions for the SPS resource allocation would be performed using the ACK-only feedback configuration or the NACK-only feedback configuration.

25. The method of claim 21, wherein the SPS resource allocation is associated with a window, and wherein selecting the feedback configuration is performed dynamically for the window.

26. The method of claim 21, further comprising:
receiving information indicating the traffic condition.

27. The method of claim 26, wherein the information indicating the traffic condition includes a bitmap indicating whether a set of SPS occasions of the SPS resource allocation are empty.

28. The method of claim 26, wherein the information indicating the traffic condition includes information indicating at least one of a number of empty SPS occasions of the SPS resource allocation or the number of non-empty SPS occasions of the SPS resource allocation.

29. The method of claim 21, further comprising:
receiving information indicating the feedback configuration that is selected, wherein selecting the feedback configuration is based on the information indicating the feedback configuration that is selected.

30. A method of wireless communication performed by a base station, comprising:
selecting, from an acknowledgment (ACK)-only feedback configuration and a negative ACK (NACK)-only feedback configuration, a feedback configuration for a semi-persistent scheduling (SPS) resource allocation based on an error rate and a traffic condition associated with the SPS resource allocation, wherein:
the SPS resource allocation includes M SPS occasions, M being an integer quantity;
the traffic condition indicates a number of non-empty SPS occasions K of the M SPS occasions, K being an integer quantity;
the error rate indicates a target block error rate (BLER) X, X being a value between zero and one; and
the feedback configuration is selected based on K, M, and X; and receiving, from a user equipment (UE), feedback regarding the SPS resource allocation using the feedback configuration that is selected.

* * * * *